United States Patent

Motomura et al.

Patent Number: 6,114,062
Date of Patent: Sep. 5, 2000

[54] ELECTRODE FOR LITHIUM SECONDARY BATTERY AND METHOD FOR MANUFACTURING ELECTRODE FOR LITHIUM SECONDARY BATTERY

[75] Inventors: Hikaru Motomura; Kazuhiro Hasezaki, both of Nagasaki, Japan

[73] Assignee: Mitsubishi Heavy Industries, Ltd., Tokyo, Japan

[21] Appl. No.: 09/154,729

[22] Filed: Sep. 17, 1998

[30] Foreign Application Priority Data

Oct. 9, 1997 [JP] Japan .................................. 9-277072

[51] Int. Cl.$^7$ ...................................................... H01M 4/60
[52] U.S. Cl. ........................ 429/213; 429/217; 429/218.1; 429/231.1; 429/231.3; 429/231.8; 429/231.95; 252/182.1
[58] Field of Search ...................................... 429/213, 217, 429/218.1, 231.1, 231.3, 231.8, 231.95; 252/182.1

[56] References Cited

FOREIGN PATENT DOCUMENTS

| 40 15 495 | 8/1991 | Germany . |
| 42 21 849 | 2/1994 | Germany . |
| 195 37 013 | 6/1997 | Germany . |

*Primary Examiner*—Laura Weiner
*Attorney, Agent, or Firm*—Oblon, Spivak, McClelland, Maier & Neustadt, P.C.

[57] ABSTRACT

It is the object of the present invention to provide an electrode for a lithium secondary battery which employs a binding agent which increases the adhesion between the particles of the active material for the electrode, or between the active material for the electrode and a metallic collector, without requiring an organic solvent during the production of the electrode.

The present invention's lithium secondary battery electrode is provided with an active material for an electrode and a binding agent comprising a bisallylnadiimide compound or an allylnadiimide compound, which are water-dispersible, low molecular weight addition polymerized imide monomers, wherein the electrolytically active particles are held together by the binding agent.

21 Claims, 2 Drawing Sheets

1: MIXTURE (ACTIVE MATERIAL FOR ELECTRODE LAYER)
2: COLLECTOR

ELECTRODE FOR LITHIUM SECONDARY BATTERY AND METHOD FOR MANUFACTURING ELECTRODE FOR LITHIUM SECONDARY BATTERY

BACKGROUND OF THE INVENTION

1. Field of the Invention

The present invention relates to an electrode for a lithium secondary battery employed to store electrical energy, as well as to a lithium secondary battery provided with the aforementioned electrode.

This application is based on patent application No. Hei 9-277072 filed in Japan, the content of which is incorporated herein by reference.

2. Description of Related Art

Cathodes and anodes for lithium secondary batteries have been manufactured as follows.

A powder of a cathode or anode active electrode material is added to an N-methylpyrolidone (NMP) solution in which the binding agent polyvinylidene fluoride (PVdF) has been dissolved, with the powder dispersed and mixed into the solution. In addition, as required, the powder of a conductive material such as carbon may also be added to the N-methylpyrolidone (NMP), and dispersed and mixed therein. As a result, a slurry containing a mixture of the cathode or anode active electrode material and the binding agent is obtained.

This slurry is then coated to a metallic collector such as aluminum, copper or nickel foil and dried. As a result, the N-methylpyrolidone (NMP) is removed by evaporation during drying, to obtain the positive or negative electrode.

N-methylpyrolidone (NMP) is an organic solvent, however. Accordingly, harmful organic gases are released during drying, making this technique problematic in terms of its safety.

In order to avoid this problem, it is necessary to provide expensive equipment to recover the organic solvent. As a result, it becomes costly to produce the electrode.

SUMMARY OF THE INVENTION

The present invention was conceived in consideration of the above described circumstances, and has as its objective the provision of an electrode for a lithium secondary battery which employs a binding agent which increases the adhesion between the particles of the active electrode material for the electrode, or between the active electrode material for the electrode and the metallic collector, without requiring an organic solvent during the production of the electrode.

It is a further objective of the present invention to provide a lithium secondary battery employing the aforementioned electrode.

This invention is an electrode for a lithium secondary battery provided with the active electrode material for an electrode and a binding agent comprising a bisallylnadiimide compound or an allylnadiimide compound, which are water-dispersible, low molecular weight addition polymerized imide monomers, wherein particles of the electrolytically active electrode material are held together by a binding agent.

The present invention employs a bisallylnadiimide or allylnadiimide compound as the binding agent for the electrode for the lithium secondary battery. As a result, a high level of adhesion can be achieved between the particles of the active electrode material for the electrode, or between the active electrode material for the electrode and the metallic collector.

Moreover, because the bisallylnadiimide or allylnadiimide compound has excellent dispersion in water (i.e., it disperses in water and does not clump), water can be used as the solvent.

Thus, an organic aqueous solvent does not need to be used when making the electrode, eliminating the need for expensive recovery equipment. As a result, it is possible to provide a lithium secondary battery at low cost.

PREFERRED EMBODIMENTS OF THE PRESENT INVENTION

A first embodiment of the present invention's electrode for a lithium secondary battery will be explained using FIG. 1.

Figure 1:
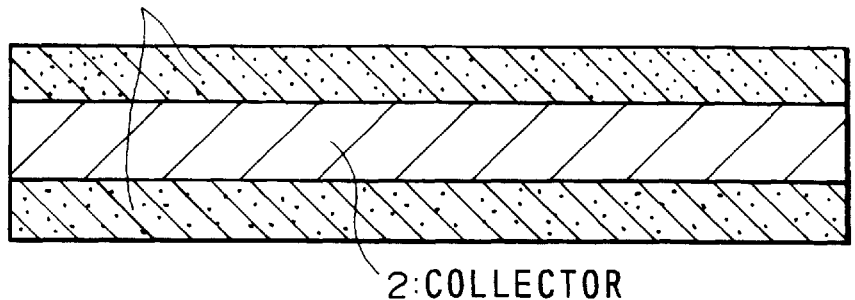
FIG. 1 is a cross-sectional view showing one example of the present invention's electrode for a lithium secondary battery.

In FIG. 1, the numeral 1 indicates a mixture (active electrode material for electrode layer) in which particles the cathode or anode active electrode material (active electrode material for electrode) is bound with a binding agent comprising bisallylnadiimide or allylnadiimide. The numeral 2 indicates a collector comprising a conductive metallic foil.

A conductive material comprising carbon is included in mixture 1 as needed.

Figure 2:
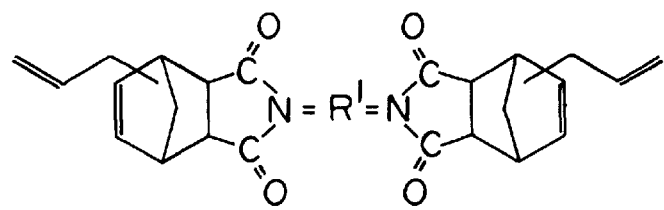
FIG. 2 is a formula of compound (a) showing of a binding agent one example of the present invention's binding agent for lithium secondary battery.
Figure 3:
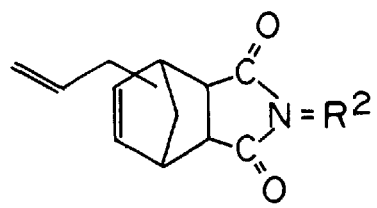
FIG. 3 is a formula of compound (b) showing of a binding agent one example of the present invention's binding agent for lithium secondary battery.
Figure 4:
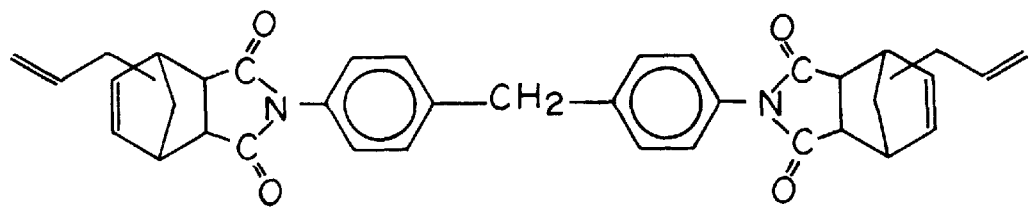
FIG. 4 is a formula of compound (c) showing of a binding agent one example of the present invention's binding agent for lithium secondary battery.
Figure 5:
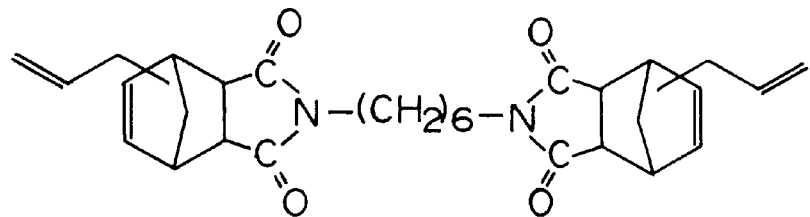
FIG. 5 is a formula of compound (d) showing of a binding agent one example of the present invention's binding agent for lithium secondary battery.
Figure 6:
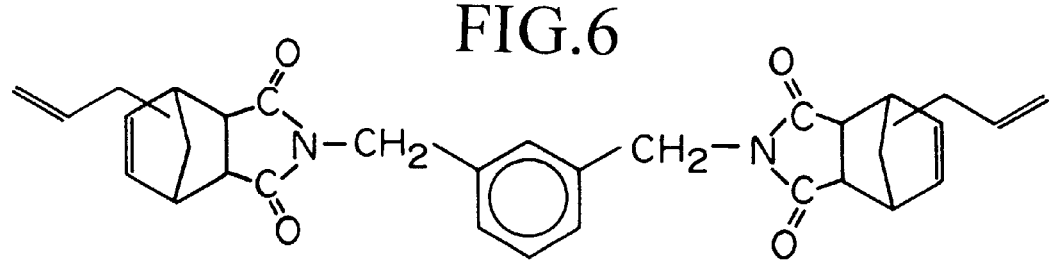
FIG. 6 is a formula of compound (e) showing of a binding agent one example of the present invention's binding agent for lithium secondary battery.
Figure 7:
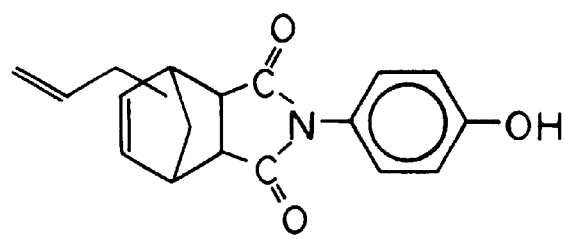
FIG. 7 is a formula of compound (f) showing of a binding agent one example of the present invention's binding agent for lithium secondary battery.
Figure 8:
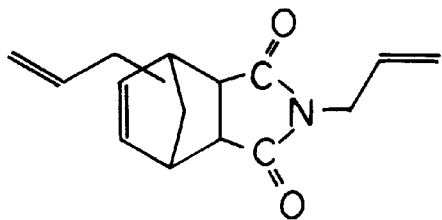
FIG. 8 is a formula of compound (g) showing of a binding agent one example of the present invention's binding agent for lithium secondary battery.

Bisallylnadiimide compounds represented by formula (a) in FIG. 2, or allylnadiimide compounds represented by formula (b) in FIG. 3, are preferably employed as the binding agent for binding the particles of the cathode or anode active electrode material (which may include an auxiliary component such as a conductive material as required).

$R^1$ in formula (a) represents bivalent alkyl groups of 2C or greater, and preferably in the range of 2 to 15C. $R^2$ in formula (b) represents monovalent alkyl groups of 2C or greater, and preferably in the range of 2 to 15C. $R^1$ and $R^2$ may also represent other substituents in addition to alkyl groups.

These alkyl groups may include other substituents such as a phenyl group.

Preferred examples of bisallylnadiimide and allylnadiimide compounds employed in the present invention include the compounds (c) through (g) cited below.

Compound (c): bis-{4-(allylbicyclo[2,2,1)hept-5-en-2,3-dicarboxyimide)phenyl}methane Compound (d): N,N'-hexamethylene-bis(allylbicyclo[2,2,1] hept-5-en-2,3-dicarboxyimide)

Compound (e): N,N'-m-xylene-bis(allylbicyclo [2,2,1]hept-5-en-2,3-dicarboxyimide)

Compound (f): N-hydroxyphenyl-allylbicyclo[2,2,1]hept-5-en-2,3-dicarboxyimide

Compound (g): N-allyl-allylbicyclo{2,2,]hept-5-en-2,3-dicarboxyimide

The bisallylnadiimide or allylnadiimide compound employed in the binding agent in the present invention is an addition polymerized imide monomer having a low molecular weight which is at maximum 570, and excellent dispersion in water (i.e., disperses in water and does not clump).

The present invention's electrode for a lithium secondary battery is produced as follows, for example.

The method for making a positive electrode will be explained first. To begin, the powder of a cathode active electrode material like $LiMn_2O_4$, $LiNiO_2$, $LiCoO_2$ or the like and a conductive material comprising a carbon powder are mixed together.

Next, a bisallylnadiimide or allylnadiimide compound is mixed into this mixture as a binding agent.

Water is added to the mixture to form a uniform aqueous slurry.

From the perspective of the electrolytic characteristics and capacity to form a film, it is preferable that the average particle diameter of the powders included in this aqueous slurry be in the range of 0.1~30 $\mu$m for the cathode active electrode material, 0.01~11 $\mu$m for the carbon or other conductive material, and 30 $\mu$m or less for the binding agent.

The carbon or other such conductive material is added to improve the electrode's lithium ion and electron conductivity. It is not preferable to add the conductive material in only small quantities, as a high level of lithium ion and electron conductivity cannot be attained in this case. Conversely, adding an excessive amount of conductive material is also undesirable, since the mass of the cathode active electrode material included in the electrode decreases, thus reducing the charging capacity of the lithium secondary battery.

The proportion of the conductive material in the mixture comprising the cathode active electrode material and the conductive material is preferably in the range of 5 to 30% by weight.

The concentration of the solid component in the aqueous slurry is preferably in the range of 30~60% by weight.

The proportion of the binding agent comprising the solid component is in the range of 3~30% by weight. "Solid component" as employed here indicates the cathode active electrode material, conductive material, and the binding agent.

Use of the binding agent in a proportion of less than 3% by weight is undesirable, because the individual particles of the cathode active electrode material cannot be bound together because the quantity of binding agent is insufficient. Conversely, when the proportion of binding agent exceeds 30% by weight, then the non-conductive portion of the mixture becomes too great, leading to an increase in the electrode's internal resistance. As a result, the charge/discharge capacity of the lithium secondary battery is reduced.

With respect to the collector for the cathode electrode, aluminum foil, nickel foil, or a metallic mesh of these is particularly suitable.

The aqueous slurry formulated in this way is then adhered to the surface of the collector using a doctor blade or other such coating method. The coating is then dried. It is also acceptable to perform a press treatment on the dried aqueous slurry as needed.

The collector and the aqueous slurry coated thereto are heat treated at a temperature of 100~500° C. As a result, a layer of the cathode active electrode material is obtained in which the cathode active electrode material is strongly adhered due to the binding agent. This cathode active electrode material layer is affixed strongly to the surface of the collector.

As a result, an electrode which can be employed as the cathode in a lithium secondary battery is obtained in which a layer of the cathode active electrode material is adhered to the collector.

When the temperature of the heat treatment is less than 100° C., moisture remains in the layer of the cathode active electrode material, causing the charge/discharge capacity of the lithium secondary battery to fall. Conversely, when the temperature of the heat treatment exceeds 500° C., the binding agent breaks down and evaporates.

The duration of the heat treatment may be optimally selected after taking into consideration the type of cathode active electrode material, conductive material, and binding agent, the thickness of the active electrode material for the electrode layer, the temperature of the treatment, and the like. However, a treatment time of 1 hour or more is usually sufficient.

When forming an electrode to be employed as a anode, the process is almost entirely the same as when forming the cathode electrode, except that a carbon powder such as graphite is used as the anode active electrode material.

Aluminum foil, nickel foil, or a metallic mesh of these two is particularly suitable for the collector of an electrode employed as an anode.

EXAMPLE 1

(Production of cathode)

The electrode for the lithium secondary battery cathode shown in FIG. 1 was formed using $LiMn_2O4$, $LiNiO_2$, or $LiCoO_2$ as the active electrode material for the cathode, and aluminum foil for the collector.

Numeral 1 in FIG. 1 corresponds to a mixture formed by binding together carbon powder and the powder of the active electrode material for the cathode for a lithium secondary battery using a binding agent comprising bisallylnadiimide or allylnadiimide. The number 2 in the figure corresponds to an aluminum foil cathode collector.

The cathode electrode was formed as follows. Particle cathode active electrode material having an average particle diameter of 5 $\mu$m and the conductive material carbon black (carbon) having an average particle diameter of 0.1 $\mu$m or less was mixed in a proportion of 8:2 by weight ratio. A binding agent, comprising bisallylnadiimide or allylnadiimide, and water were added to the obtained mixture to form a uniform aqueous slurry.

The quantity of cathode active electrode material, conductive material, binding agent, and water was formulated so that the concentration of the solid component in the aqueous slurry was 50% by weight. The quantity of the cathode active electrode material, conductive material and binding agent was adjusted so that the binding agent comprised a specific proportion of the total solid component.

The aqueous slurry was coated to the surface of aluminum foil (cathode collector) using the doctor blade method. Next, the aqueous slurry was dried by blowing warm air at a temperature of 70° C. The aqueous slurry was coated in the same manner to the surface of the aluminum foil, and dried by blowing warm air at a temperature of 70° C.

The dried aqueous slurry was then compressed by pressing, and heat treated at a specific temperature for a specified period of time to obtain an electrode for use as a cathode.

All the mixtures of the cathode electrode (i.e., cathode active electrode material layer) had a thickness of 75 $\mu$m. The thickness of the aluminum foil was 18 $\mu$m. The conditions for forming the electrode to be employed as the cathode are shown in Table 1.

TABLE 1

| Test No. | cathode active material | binding agent | | heat treatment | |
|---|---|---|---|---|---|
| | | type | proportion present in solid component (wt %) | temp (° C.) | time (hr) |
| 1 | $LiMn_2O_4$ | e | 15 | 300 | 2 |
| 2 | LiNiO2 | d | 15 | 300 | 2 |
| 3 | LiCoO2 | c | 15 | 300 | 2 |
| 4 | $LiMn_2O_4$ | f | 30 | 500 | 1 |
| 5 | $LiMn_2O_4$ | g | 3 | 100 | 1 |

EXAMPLE 2

(Charge/discharge test for lithium secondary battery employing cathode electrode formed in Example 1)

A lithium secondary battery was formed using the cathode electrode obtained in Example 1, and charge/discharge tests carried out.

$LiPF_6$ was mixed into equivolume mixed solvents of ethylene carbonate and dimethylcarbonate or the like, to form an electrolyte. The electrolyte was formulated so that the concentration of $LiPF_6$ per mass of the electrolyte was 1 mole/kg.

The cathode electrode from Example 1 and lithium metal which has been applied to nickel steel was soaked in the electrolyte, to form a cathode and anode respectively. Ultrasonic welding was used to attach lead wires formed from copper wire to the cathode and anode respectively, thereby forming the lithium secondary battery.

A charge/discharge evaluation of the lithium secondary battery was carried by repeatedly charging and discharging the battery at charge cutoff voltage of 4.5 V, a discharge cutoff voltage 3.0 V, and a charge/discharge current density of 0.1 mA/cm².

Table 2 shows the discharge capacity for the active electrode material on the $2^{nd}$ and $50^{th}$ cycles. Note that while carbon is usually employed in the the anode of a lithium secondary battery, a lithium anode was employed here.

It may be seen from the results in Table 2 that the capacity fell slightly on the $50^{th}$ cycle for the test material in this example, however a discharge capacity of above 100 mAH/g was still obtained.

Accordingly, it may be understood that a binding agent comprising a bisallylnadiimide or allylnadiimide compound is effective as a binding agent for a lithium second battery cathode.

TABLE 2

| Test No. | discharge capacity (mAh/g) | |
|---|---|---|
| | $2^{nd}$ cycle | $50^{th}$ cycle |
| 1 | 110 | 103 |
| 2 | 185 | 120 |

TABLE 2-continued

| Test No. | discharge capacity (mAh/g) | |
|---|---|---|
| | $2^{nd}$ cycle | $50^{th}$ cycle |
| 3 | 120 | 118 |
| 4 | 110 | 108 |
| 5 | 110 | 100 |

EXAMPLE 3

(Formation of anode electrode)

An anode electrode for the lithium secondary battery shown in FIG. 1 was formed using copper foil for the collector and artificial graphite as the anode active electrode material.

In FIG. 1, the numeral 1 indicates a mixture in which the particles of the anode active electrode material employed for the lithium secondary battery is bound with a binding agent comprising a bisallylnadiimide or allylnadiimide compound. The numeral 2 indicates a copper foil anode collector.

The anode electrode was formed as follows. Artificial graphite having an average particle diameter 10 $\mu$m and a binding agent comprising bisallylnadiimide or allylnadiimide were mixed. Water was added to this mixture, and mixed to obtain a uniform aqueous slurry.

The quantity of anode active electrode material, binding agent, and water was adjusted so that the concentration of the solid component in the aqueous slurry was 50% by weight. The quantity of the anode active electrode material and binding agent were adjusted so that the binding agent comprised a specific proportion of the total solid component. Note that "solid component" as used here indicates the mixture of the anode active electrode material and the binding agent.

The aqueous slurry was coated to the surface of copper foil (anode collector) using a doctor blade method. Next, the aqueous slurry was dried with warm air at 70° C. In the same manner, the aqueous slurry was also coated to the surface of copper foil, and dried with warm air at 70° C.

The dried aqueous slurry was then compressed by pressing, and heat treated at a specific temperature for a specified period of time to obtain an anode electrode.

The anode electrode mixtures (i.e., anode active electrode material layer) were all 75 $\mu$m. The thickness of the copper foil was 18 $\mu$m. The conditions for forming the anode electrode are shown in Table 3.

TABLE 3

| Test No. | anode active material | binding agent | | heat treatment | |
|---|---|---|---|---|---|
| | | type | proportion present in solid component (wt %) | temp (° C.) | time (hr) |
| 6 | artificial graphite | e | 15 | 300 | 2 |
| 7 | artificial graphite | d | 3 | 300 | 2 |
| 8 | artificial graphite | c | 30 | 300 | 2 |

EXAMPLE 4

(Charge/discharge test for lithium secondary battery employing anode electrode of Example 3)

A lithium secondary battery was formed using the anode electrode obtained in Example 3, and charge/discharge tests were carried out.

LiPF$_6$, was mixed into an equivolume mixed solvent of ethylene carbonate and dimethylcarbonate, to form an electrolyte. The electrolyte was formulated so that the LiPF$_6$ concentration per electrolyte mass was 1 mole/kg.

The anode electrode from Example 3 and lithium metal which had been applied to nickel steel were soaked in the electrolyte, to form anode and cathode respectively. Ultrasonic welding was then used to attach lead wires formed from copper wire to the anode and cathode respectively, thereby lithium secondary battery.

A charge/discharge evaluation of the lithium secondary battery was carried out by repeatedly charging and discharging the battery at a charge cutoff voltage of 0.0 V, a discharge cutoff voltage of 2.0 V, and a charge/discharge current density of 0.1 mA/cm$^2$.

Table 4 shows the discharge capacity for the active material on the 2$^{nd}$ and 50$^{th}$ cycles.

It may be seen from the results in Table 4 that while the capacity fell slightly on the 50$^{th}$ cycle for the test material in this example, discharge capacity of above 230 mAh/g was still obtained.

Accordingly, it may be understood that a binding agent comprising a bisallylnadiimide or allylnadiimide compound may be effectively employed as a binding agent for a lithium secondary battery anode.

TABLE 4

| Test No. | discharge capacity (mAh/g) | |
|---|---|---|
| | 2$^{nd}$ cycle | 50$^{th}$ cycle |
| 6 | 250 | 240 |
| 7 | 260 | 240 |
| 8 | 240 | 230 |

What is claimed:

1. An electrode for a lithium secondary battery, comprising:
    active electrode particles; and
    a binding agent comprising a bisallylnadiimide or allylnadiimide compound, which are water-dispersible, low molecular weight addition polymerized imide monomers,
    wherein said active electrode particles are bound by said binding agent.

2. An electrode for a lithium secondary battery according to claim 1, wherein said active electrode particles comprise a cathode active electrode material.

3. An electrode for a lithium secondary battery according to claim 1, wherein said active electrode particles comprise at least one of LiCoO$_2$, LiMn$_2$O$_4$, LiNiO$_2$, and a mixture thereof.

4. An electrode for a lithium secondary battery according to claim 1, wherein said active electrode particles comprise an anode active electrode material.

5. An electrode for a lithium secondary battery according to claim 1, wherein said active electrode particles comprise graphite.

6. An electrode for a lithium secondary battery according to claim 1, wherein said bisallylnadiimide or allylnadiimide is one or more compounds selected from the group consisting of bis-{4-(allylbicyclo[2,2,1]hept-5-en-2,3-dicarboxyimide)phenyl}methane, N,N'-hexamethylenebis(allylbicyclo[2,2,1]hept-5-en-2,3-dicarboxyimide), N,N'-m-xylene-bis(allylbicyclo[2,2]hept-5-en-2,3-dicarboxyimide), N-hydroxyphenyl-allylbicyclo [2,2,1]hept-5-en-2,3-dicarboxyimide, N-allyl-allylbicyclo[2,2,1]hept-5-en-2,3-dicarboxyimide, and a mixture thereof.

7. An electrode for a lithium secondary battery according to claim 1, further comprising a collector for adhering said active electrode particles and said binding agent.

8. An electrode for a lithium secondary battery, prepared by the steps of:
    adhering to the surface of a collector an aqueous slurry containing active electrode particles and a binding agent comprising a bisallylnadiimide or allylnadiimide compound, which are water-dispersible, low molecular weight addition polymerized imide monomers, wherein said active electrode particles are bound by said binding agent;
    drying said collector prepared in said adhering step; and
    heat-treating said collector of said drying step at a temperature of 100–500° C. for one hour or more.

9. An electrode for a lithium secondary battery according to claim 7, wherein said active electrode particles comprise a cathode active electrode material.

10. An electrode for a lithium secondary battery according to claim 8, wherein said active electrode particles comprise at least one of LiCoO$_2$, LiMn$_2$O$_4$, LiNiO$_2$, and a mixture thereof.

11. An electrode for a lithium secondary battery according to claim 8, wherein said active electrode particles comprise an anode active electrode material.

12. An electrode for a lithium secondary battery according to claim 8, wherein said active electrode particles comprise graphite.

13. An electrode for a lithium secondary battery according to claim 8, wherein said bisallylnadiimide or allylnadiimide is one or more compounds selected from the group consisting of bis-{4(allylbicyclo[2,2,1]hept-5-en-2,3-dicarboxyimide)phenyl}methane, N,N'-hexamethylenebis(allylbicyclo[2,2,1]hept-5-en-2,3-dicarboxyimide), N,N'-m-xylene-bis(allylbicyclo[2,2,1]hept-5-en-2,3-dicarboxyimide), N-hydroxyphenyl-allylbicyclo[2,2,1]hept-5-en-2,3-dicarboxyimide, N-allyl-allylbicyclo[2,2,1]hept-5-en-2,3-dicarboxyimide, and a mixture thereof.

14. A lithium secondary battery comprising:
    an electrode comprised of active electrode particles; and
    a binding agent comprising a bisallylnadiimide or allylnadiimide compound, which are water-dispersible, low molecular weight addition polymerized imide monomers,
    wherein said active electrode particles are bound by said binding agent.

15. A lithium secondary battery according to claim 14, wherein said active electrode particles comprise a cathode active material.

16. A lithium secondary battery according to claim 14, wherein said active electrode particles comprise at least one of LiCoO$_2$, LiMn$_2$O$_4$, LiNiO$_2$, and a mixture thereof.

17. A lithium secondary battery according to claim 14, wherein said active electrode particles comprise an anode active material.

18. A lithium secondary battery according to claim 14, wherein said active electrode particles comprise graphite.

19. A lithium secondary battery according to claim 14, wherein said bisallylnadiimide or allylnadiimide is one or more compounds selected from the group consisting of bis-{4-(allylbicyclo[2,2,1]hept-5-en-2,3 -dicarboxyimide) phenyl}methane, N, N'-hexamethylene-bis(allylbicyclo[2,2,1]hept-5-en-2,3 -dicarboxyimide), N,N'-m-xylene-bis (allylbicyclo[2,2,1]hept-5-en-2,3-dicarboxyimide), N-hydroxyphenyl-allylbicyclo [2,2,1]hept-5-en-2,3 -dicarboxyimide, N-allyl-allylbicyclo[2,2,1]hept-5-en-2,3-dicarboxyimide, and a mixture thereof.

20. A lithium secondary battery, comprising:

a first electrode comprised of cathode active electrode particles;

a binding agent for cathode electrode particles comprising a bisallylnadiimide or allylnadiimide compound, which are water-dispersible, low molecular weight addition polymerized imide monomers, wherein said cathode active electrode particles are bound by said binding agent for cathode electrode particles;

a second electrode comprised of anode active electrode particles; and a binding agent for anode electrode particles comprising a bisallylnadiimide or allylnadiimide compound, which are water-dispersible, low molecular weight addition polymerized imide monomers, wherein said anode active electrode particles are bound by said binding agent for anode electrode particles.

21. A method for manufacturing an electrode for a lithium secondary battery, comprising the steps of:

adhering to the surface of a collector an aqueous slurry containing active electrode particles and a binding agent comprising a bisallylnadiimide or allylnadiimide compound, which are water-dispersible, low molecular weight addition polymerized imide monomers;

drying said collector prepared in said adhering step; and heat-treating said collector of said drying, step at a temperature of 100–500° C. for one hour or more.

* * * * *